May 25, 1965 J. DAUBERSY 3,185,463
APPARATUS FOR CONDITIONING AIR AND GASES FOR ANNEALING
STEEL PLATES AND THE LIKE
Filed July 13, 1961
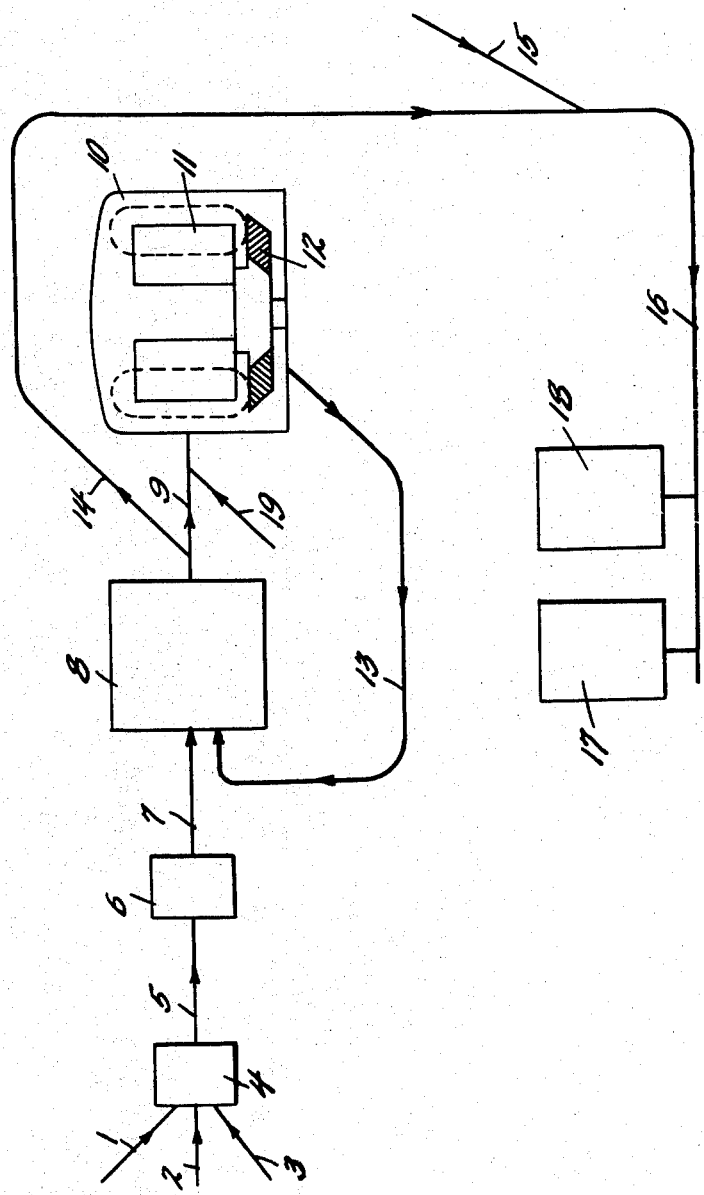
INVENTOR
Jean Daubersy,
BY
ATTORNEYS

United States Patent Office 3,185,463
Patented May 25, 1965

3,185,463
APPARATUS FOR CONDITIONING AIR AND GASES FOR ANNEALING STEEL PLATES AND THE LIKE
Jean Daubersy, Seraing, Belgium, assignor to S.A. Metallurgique d'Esperance-Longdoz, Liege, Belgium
Filed July 13, 1961, Ser. No. 123,835
Claims priority, application Belgium, July 18, 1960, 593,133
2 Claims. (Cl. 266—5)

This invention relates to a process and apparatus for conditioning air and gases for annealing steel plates and the like.

The possibility of extracting carbon and nitrogen from steel plates by annealing in moist hydrogen is well known, and it has likewise been known that it is possible during this treatment to extract the last traces of carbon and nitrogen from a molten steel plate to thereby render this plate perfectly insensitive to aging. Numerous theoretical and experimental studies have been made on this subject and in particular may be mentioned a very complete study made by J. R. Low and H. Jensamer (Metals Technology, December 1943).

In spite of the great technical interest in such a process for the plate industry it has not been possible to realize any practical application since the cost price of such an annealing operation is prohibitive in view of the market value of a good plate. Two principal factors, in fact, were disadvantageous to the cost price, on the one hand the very slight productive capacity of the continuous annealing furnaces which had to be utilized instead of the bell-shaped furnaces in order to permit the action of the atmospheric gases on the plate, and on the other hand, the high cost of hydrogen gas of great purity. The treatment involving both decarburizing and denitriding the hydrogen gas must be especially pure insofar as carbon monoxide, hydrocarbons, and nitrogen are concerned.

At the present time the first of these factors seems to have found a solution as it has been possible in fact to roll coils of plates in non-joined spirals with such a precision that the gas circulating in the bell-shaped annealing furnace can pass between the spirals of the coil and act with a sufficient regularity on the entire surface of the plate thus rolled.

However the second factor has not yet received a satisfactory solution since in order for the process to be able to find a field of application it is still necessary to reduce considerably the expenditure for the great quantities of pure hydrogen which have been found to be necessary in practice.

It must be noted that in consequence of the reactions of decarburation and denitriding the moist hydrogen gas in circulation in the furnace is charged with carbon monoxide and free or combined nitrogen. The degree of decarburization and of denitriding sought necessary for suppressing the tendency to aging is particularly high, and indeed the traces of carbon and nitrogen which can be allowed to subsist are beyond the actual possibilities of analysis.

Experiments show that such low contents are not realizable for acceptable durations of annealing, unless the circulation gases in the atmosphere of the furnace or furnaces are renewed sufficiently quickly to maintain very low their own contents of carbon monoxide and nitrogen. In fact, it has been possible to make non-aging plates by utilizing flows of hydrogen of the order of 10 cubic meters per hour and per ton of steel for 20 hours, and these figures do not constitute necessary limits but fix orders of magnitude showing the importance of the expenditure for hydrogen.

It is an object of the present invention to provide the gases circulating in the atmosphere of the furnace and polluted in the course of their passage in the said furnace by carbon monoxide and nitrogen to be recycled after purification. This purification is characterized in that it removes from the moist hydrogen only the carbon monoxide and contingently the traces of combined nitrogen but not the free nitrogen. The complete operation of purification from carbon monoxide and molecular and atomic nitrogen which would be the logical operation proves too costly and, according to the invention, the formation of nitrogen is remedied by the following: at the outlet of the stage for carbon monoxide purification there is removed a flow of gas sufficient to prevent a perceptible increase in the content of nitrogen of the gases in circulation in the furnace, and this leakage flow composed of hydrogen associated with a little nitrogen and water vapor finds normally a profitable utilization in the annealing works for the production of the atmosphere gas HNX intended for the usual annealing furnaces.

By perceptible increase in the content of nitrogen there must be understood an increase of the order of 0.5 percent.

The atmosphere gas called HNX is in fact a dry mixture of nitrogen and hydrogen in which the content of molecular hydrogen is established generally between 5 and 10 percent. This gas is quite useful as annealing atmosphere for it permits the production of plates with a particularly clean surface and cannot form an explosive mixture. According to the invention the HNX gas is produced by adding pure nitrogen and in adequate proportions to the leakage flow, contingently dehydrated, taken from the plant for the purification of carbon monoxide from the atmospheres of moist hydrogen.

Finally, the hydrogen fabricated will have been utilized twice in succession, a first time in the pure and moist state in the annealing furnace for non-aging plates and a second time in ordinary furnaces with HNX atmosphere.

The source of nitrogen for the production of the HNX gas is in principle a matter of indifference. However, attention is called to the fact that the installation of very large units for oxygen production by distillation of air is common in most metallurgical complexes and more especially those which are concerned with the sheet plate industry. According to the invention, the leakage flow of hydrogen polluted with nitrogen finds a particularly worthwhile utilization for the production of HNX gas by mixture with the nitrogen which it is now possible to take from apparatus for distilling oxygen in important quantities and with degrees of purity characterized by contents of oxygen equal to or less than 30 parts per million.

Furthermore there is not excluded from the scope of the invention the not very economical but however still acceptable solution in which the leakage flow instead of being utilized for the production of HNX gas would be used as a combustible gas or even allowed to go to waste. It should also be noted that in actual economic conditions the method most generally indicated for producing hydrogen free from nitrogen and carbon compounds consists in subjecting liquid or gaseous hydrocarbons to a cracking methd in the presence of oxygen and/or water vapor. It implies, therefore, a process for purification from carbon monoxide formed at the time of cracking, a classical process in the chemical industry and which consists in converting carbon monoxide into hydrogen and carbonic anhydride by the action of water vapor and in extracting the said anhydride by washing. In practice, in order to realize the high degree of purity required it is desirable to place in series two stages of purification. The procedure of purification is in principle the same as that utilized in the invention for freeing from carbon monoxide, the atmosphere gases recycled. According to the invention it is possible, therefore, to simplify the ensemble by utilization of the same stage or station of purification simultaneously for the gases recycled of furnace origin and as second stage of purification for the remaining hydrogen.

In this case, according to the invention, the capacity of this common stage will be considerably greater than that of the first stage of purification of the residual gas, the ratios of the respective capacities being established between 5 and 15. According to the invention, the purification stages are provided so as to maintain the contents of carbon monoxide at an amount less than 0.5 percent.

Further objects will be apparent from the following description when considered in connection with the accompanying drawing which is a diagrammatic view by way of example to permit a better understanding of the process and apparatus according to the invention.

The hydrocarbons coming through the conduit or pipe 1 are subjected to cracking in the cracker 4 in the presence of oxygen and water vapor or steam coming respectively through the conduits or pipes 2 and 3. The cracked gas coming through the pipe 5 enters the first purification stage 6 in which it undergoes a purification by conversion of the carbon monoxide and absorption of the carbonic anhydride.

The gas then passes through the conduit or pipe 7 in the second stage of purification 8 analogous to the first but of a capacity about ten times as great. The gases suitably purified from carbon monoxide and contingently admixed with water vapor arrive through the conduit or pipe 9 to the furnace or furnaces 10. In this furnace 10 the coil or work 11 with non-joined spirals is annealed and subjected to the action of the atmosphere placed in circulation by the ventilator 12. A flow of gas practically equal to that which is introduced into the furnace through the conduit or pipe 9 is extracted through the conduit or pipe 13 and recycled after passage into the purifier 8. A leakage flow practically equal to the flow of hydrogen produced at 4 is withdrawn through the conduit or pipe 14 and is mixed with pure nitrogen coming through the conduit 15 to make the gas HNX which is distributed through the conduit or pipe 16 to the furnaces 17 and 18. The element 19 represents a conduit or pipe permitting the eventual addition of water vapor.

It has been established that in an annealing plant treating ¼ of its production with moist hydrogen and ¾ with the gas HNX a leakage flow of hydrogen gas contaminated with nitrogen equal to about 13 percent of the flow of gas recycled through the stage for purification from carbon monoxide would permit producing all of the HNX gas necessary for the other three-fourths of the production while maintaining the increase in the amount of nitrogen in the moist hydrogen below 0.5%.

I claim:
1. Apparatus for conditioning atmospheres necessary for the working of metal plate annealing furnaces, comprising at least one annealing furnace for metal plates in expanded coils, a purification station containing means for reducing the concentration of the carbon oxides and combined nitrogen concentration of the gases which it receives, means as towers for conversion of CO by water vapor, towers for absorption of $CO_2$ by washing with soda or methanolamine, absorption towers having active carbon, a source of pure hydrogen, a source of pure nitrogen, at least one bright annealing furnace, a source of water or water vapor, pipe systems connecting said elements with one another in such a way that a recycling circuit connects on the one hand the outlet of the purification station with the entrance of the expanded coil furnace and, on the other hand, the outlet of the said furnace to the entrance of the purification station and comprises a means of circulation, a pipe connecting the source of hydrogen to the recycling circuit, a withdrawal pipe connecting the recycling circuit to the bright annealing furnace, a pipe connecting the source of nitrogen to the withdrawal pipe, and a pipe connecting the source of water or water vapor to the entrance of the furnace or furnaces for the expanded coils.

2. Apparatus according to claim 1, in which the source of hydrogen itself comprises a first independent purification stage, and the purification station of the recycled gases serves simultaneously as the second purification stage for the supply of hydrogen with a capacity considerably greater than that of the first stage, the ratio of the respective capacities being preferably comprised between 5 and 15.

References Cited by the Examiner
UNITED STATES PATENTS

| | | | |
|---|---|---|---|
| 1,256,623 | 2/18 | Westberg et al. | 75—34 X |
| 2,271,242 | 1/42 | Altenburger | 148—16 |
| 2,402,013 | 6/46 | Billeter et al. | 148—16 |
| 2,557,379 | 6/51 | Hancock et al. | 148—16 |
| 2,998,303 | 8/61 | Huebler | 148—16 X |

DAVID L. RECK, *Primary Examiner.*
WINSTON A. DOUGLAS, *Examiner.*